Figure 1:
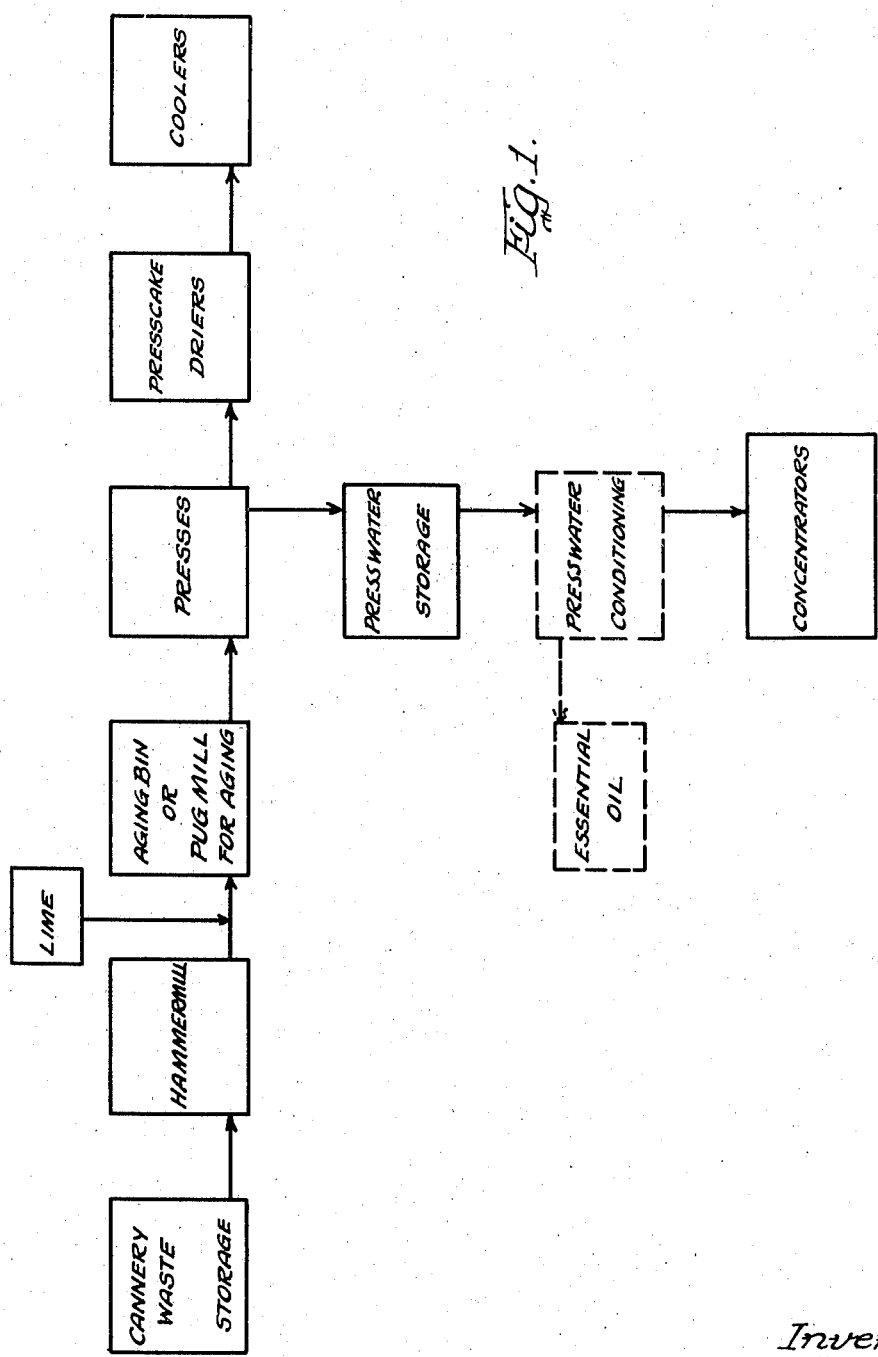

Patented May 31, 1949

2,471,893

UNITED STATES PATENT OFFICE 2,471,893

TREATMENT OF CITRUS WASTE PRESS WATER

George N. Pulley, Winter Haven, Fla., assignor to Feed Products Laboratories, Inc., Lake Alfred, Fla., a corporation of Florida Application October 12, 1946, Serial No. 702,994

3 Claims. (Cl. 99—2)

The object of the present invention, generally stated, is the provision of a method of treating the press water prior to its concentration, whereby the essential oil content is stripped therefrom and the scale-forming salts are caused to precipitate in such condition that when the thus conditioned press water is concentrated, the amount of scaling is very substantially reduced.

Canning of citrus fruit juices has become a large industry within recent years. Although oranges and grapefruit constitute the large bulk of the citrus fruits going to these canning factories, tangerines, lemons and limes are also canned on a smaller scale. The citrus fruit canning industry necessarily produces a large amount of cannery waste. This includes what remains of the citrus fruit after processing and refers to the peel, seed, rag and plup discarded by the cannery. This material will be hereinafter collectively referred to as cannery waste. This cannery waste constitutes about 60% by weight of the ripe fruit, and during the 1945–46 canning season in Florida alone, approximately one million tons of cannery waste were produced.

Along with the growth of the citrus fruit canning industry, a companion industry has been built up wherein the citrus waste is processed so as to form so-called dried citrus pulp, which is useful as cattle feed and fertilizer. Since the cannery waste consists of from about 85% to 90% water content, the manufacture of feed and fertilizer products therefrom resides largely in the reduction of this water content to a relatively small figure, such as from 9% to 10% of the dried product.

It is more economical to remove as much water as possible from the cannery waste before drying than to dry the cannery waste as received from the canner. Accordingly, the cannery waste is handled by first comminuting it into small pieces in a hammer mill or other suitable equipment, and then a small amount of hydrated lime is added to the resultant mass so as to set up chemical reactions in the mass which serve to free a substantial proportion of the water content therefrom. The limed mass is then transferred to continuous presses wherein it is possible to press out a considerable proportion of the water content. Thus, for each ton of dry product obtained, from 400 to 1000 gallons of press water is pressed out.

This press water contains from 7% to 14% dissolved and suspended solids, about 80% of which are sugar. The press water also contains from 0.20% to 0.80% essential oil, and is practically saturated with scale-forming salts. The present invention is particularly directed to the handling of this press water product so as to strip it of its essential oil content and precipitate the scale forming salts out into a non-scaling suspended form.

Heretofore, the press water has been delivered directly to evaporators wherein it is concentrated, and the concentrated press water is disposed of as a by-product, there being a demand for it because of its sugar content. During the concentration process the essential oil content contained in the press water passes off with the vapors and is either discarded, or may be partially recovered by condensing the vapors and separating the essential oil content by decantation. This method of removing and recovering the essential oil content from the press water is unsatisfactory because of the difficulty of separating a small amount of essential oil dispersed in a very large volume of water.

To illustrate: a plant processes 5000 gallons (43,000 pounds) of press water containing 0.5% by volume of essential oil and produces 8600 pounds of concentrated press water. In order to produce this concentrated press water it is necessary to evaporate 4150 gallons of water and this evaporated water, after being condensed, will contain 25 gallons of essential oil. Data has been obtained which shows that an average of 60% or 15 gallons of the oil will be recovered.

By practicing this invention you would remove the oil by evaporating 10% of 5000 gallons. This would give you 500 gallons of condensate containing 25 gallons of essential oil. 95% or 23.7 gallons of this oil can be recovered.

At the present time, the scale-forming salts with which the press water is fairly well saturated, cause objectionable scale formation on the heat transfer surfaces of the evaporators so as to require the evaporators to be frequently shut down and boiled out in order that the heat transfer efficiency can be re-established. This problem is particularly serious in connection with evaporators having heat transfer units in the form of tubes of small diameter in which the press water is circulated, with the outer surfaces of the tubes being exposed to the heating medium, which is ordinarily steam. When the heating surfaces become so heavily covered with scale that the heat transfer efficiency drops too greatly, the evaporator has to be shut down and the scale removed by boiling out with a suitable cleaning solution. It is sometimes necessary to clean an evaporator after every 24 to 48 hours of operation.

By practicing this invention the heat used to vaporize the essential oil precipitates the scale-forming material in the press water in such a condition that the concentrators may be operated about 96 hours before it is necessary to boil them out with a cleaning solution.

For a more complete understanding of the nature and scope of the invention, reference may now be had to the following detailed description thereof, taken in conjunction with the accompanying drawings, wherein:

Figure 1 is a flow diagram showing the process of manufacturing dried stock feed or fertilizer products from cannery waste, wherein the various steps of one type of process are indicated by boxes with appropriate legends thereon, with the press water conditioning step to which the present invention is directed being indicated in broken line boxes so as to set it off from the other conventional steps:

Heretofore, the press water was taken directly from press water storage, or directly from the presses themselves, and delivered into concentrators. In accordance with the present invention, the press water is given a conditioning treatment preliminary to its delivery into the concentrator. The conditioning treatment serves to strip substantially all of the essential oil content therefrom and causes the scale-forming salts in the press water to precipitate out in a suspended non-scale-forming state. Thereafter, when the thus conditioned press water is delivered to the evaporators for concentration, the essential oils have already been stripped therefrom and the scale-forming salts are in such a form as not to scale out on the heat transfer surfaces of the evaporators.

Figure 2:
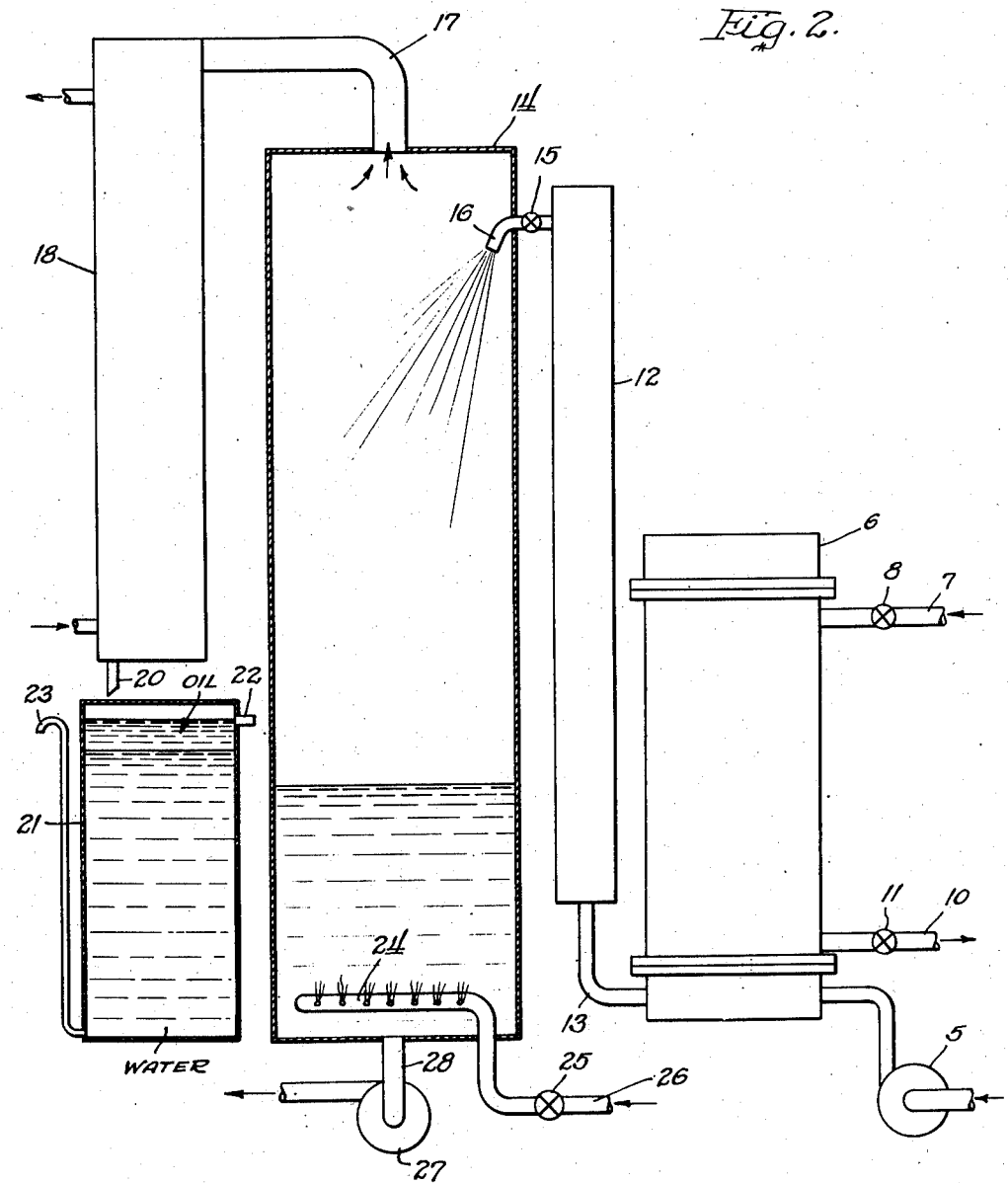

Figure 2 is a diagrammatic showing of the press water conditioning equipment of the present invention wherein the essential oil content is stripped from the press water and the scale-forming salts are precipitated therein, prior to concentrating the press water in the evaporators. Reference may now be had to Figure 2 of the drawings. A centrifugal pump 5 serves to transfer press water from the press water storage, or directly from the presses, to the inlet side of a steam heated shell and tube type heat exchanger 6. Live steam is delivered into the heat exchanger 6 through a line 7 under control of a valve 8, while the spent steam is removed through the discharge line 10 under control of the valve 11. In the heat exchanger 6 the press water is heated to some 215° to 250° F. or higher.

The discharge side of the heat exchanger 6 is connected with the bottom of the holding chamber 12 through the conduit 13 connected therewith. This holding chamber 12 is of such capacity as to require about 10 seconds or more for the heated juice to pass therethrough prior to delivery into a flash tank 14. During the passage of the heated press water through the chamber 12, it should be under sufficient pressure so as to prevent boiling. This pressure may be controlled by a weighted check valve 15 disposed in the outlet connection of the chamber 12.

The hot press water is sprayed into the upper part of the flash chamber 14 through a spray nozzle 16, and in so doing, the pressure is reduced and the excess heat will cause part of the juice to boil or flash into vapor. This flashing reduces the temperature of the main portion of the press water to correspond to the pressure in the flash tank 14. The vapors formed in the flashing of the press water, vaporize most of the essential oils and pass out through the vapor line 17 connected with the top of the flash chamber 14.

The holding chamber 12 serves a very important function in that it allows time for the scale-forming salts to be precipitated by the high temperature and also allows the heated press water to reach a condition such that most of the essential oil content can be separated therefrom when it is flashed through nozzle 16 into flash tank 14. As the heated press water is fed into the bottom of the holding chamber 12, it is almost completely in the liquid phase. However, as it rises upwardly through the chamber 12 and approaches the top portion thereof, an appreciable part of the body of heated press water assumes the vapor phase, interspersed in the liquid phase somewhat in the nature of a foam or aerated body of liquid, and the essential oil content in the vapor phase is relatively richer than it is in the heated liquid. The reason for this is that steam bubbles rising through the liquid in chamber 12 tend to pick up the essential oils from the heated liquid.

As the heated mass leaves nozzle 16 in the flash tank 14, the vapor phase separates from the liquid phase and is taken off through the vapor line 17. Additionally, some of the liquid phase flashes into vapor and this also is taken off through the vapor line 17. In this manner most of the essential oil content is stripped from the press water while only about 1 to 10% of the body of press water is vaporized.

The vapor line 17 connects with a water condenser 18 wherein cold water is utilized to condense the vapors so as to form a liquid condensate, which is discharged through the outlet 20 into an oil-water separating tank 21. The essential oils being lighter than water, separate out as a layer on the top thereof and are withdrawn through an overflow pipe 22. Excess water is withdrawn through an overflow pipe 23.

The unvaporized press water collects in the bottom of the flash tank 14 wherein it is kept boiling by means of steam introduced into a steam coil 24 under control of valve 25 in the steam line 26. Any essential oils not already removed in the flashing process will be vaporized from the collected press water in the bottom of the flash tank 14 and will be taken off through the vapor line 17 for condensation and recovery. In this manner, at least about 95% of the essential oil content of the press water is recovered therefrom.

The scale-forming salts in the press water have a greatly decreased solubility at an elevated temperature of from 215° to 250° F. By holding the press water in the holding chamber 12 at an elevated temperature, a few degrees higher than the temperature used for concentrating, for a sufficient period of time, as outlined above, the scale-forming material forms a precipitate which does not appreciably re-dissolve so long as the liquid stays hot and above about 212° F. In this manner, it is possible to precipitate out about 35% to 40% of the content of the scale-forming salts.

The thus conditioned press water is transferred from the bottom of the flash tank 14 to the concentrators by means of a pump 27 connecting with the bottom of the tank by the line 28.

Although the precipitated scale-forming substances are left suspended in the thus conditioned or treated press water as it goes through the concentrators, they do not cause appreciable scale formation on the heating surfaces of the concentrators.

Trial tests have been run to demonstrate that the precipitate formation brought about in the conditioning equipment is about 35% to 40% of the scale-forming substances present in the press water, and further that this corresponds to the amount of scale which would ordinarily form on the heated surface of the evaporator if the press water were concentrated directly in the evaporators without previously being given the conditioning treatment. The period over which the evaporators can be operated without serious loss of heat transfer efficiency is thus very greatly prolonged.

Greater recoveries of the essential oil content of the press water is obtained in a more convenient fashion by practicing the present invention. It will be seen that the essential oils are recovered by evaporating only a small part (1% to 10%) of the press water, whereas, under prior practice it was necessary to separate the essential oil content from a volume of water representing approximately 80% of the press water.

Having fully described my present invention and the best method of practicing same, what I claim as my invention is:

1. The process of separating essential oils and at the same time precipitating scale-forming substances from press water derived from citrus cannery waste, which comprises, heating the press water to a temperature of at least about 215° F. thereby causing scale-forming substances to precipitate therein while at the same time causing the greater part of the essential oil content and a minor portion of the water content to form a vapor phase, flash spraying the thus heated and conditioned press water into a flash tank so as to separate the greater part of the essential oil content thereof along with a minor portion of the water content as flash vapor, condensing the vapors formed on spraying, and separating the essential oils from the condensate.

2. The process called for in claim 1 wherein from about 1 to 10% of the heated press water is vaporized in said process.

3. The process of treating press water derived from citrus cannery waste so as to both separate the essential oil content thereof and precipitate scale-forming substances, which comprises, heating the press water to a temperature of at least about 215° F., holding it at such temperature for a period of time in the form of an upright column moving up at a low velocity so as to allow most of said scale-forming substances to precipitate and permit a substantial part of the essential oil content to separate in the vapor phase by the time the top of said column is reached, flashing the press water from the top of said column so as to flash off the greater part of said essential oil content along with a minor portion of the water content, condensing the flash vapors, and separating the essential oils from the condensate.

GEORGE N. PULLEY.

REFERENCES CITED

The following references are of record in the file of this patent:

UNITED STATES PATENTS

| Number | Name | Date |
| --- | --- | --- |
| 2,216,905 | Brown et al. | Oct. 8, 1940 |
| 2,298,623 | Jorgensen | Oct. 13, 1942 |